(12) United States Patent
Roy-Auberger et al.

(10) Patent No.: US 7,807,044 B2
(45) Date of Patent: Oct. 5, 2010

(54) PROCESS FOR SLURRY PHASE HYDROCONVERSION OF HEAVY HYDROCARBON FEEDS AND/OR COAL USING A SUPPORTED CATALYST

(75) Inventors: Magalie Roy-Auberger, Nivolas-Vermelle (FR); Denis Guillaume, Vienne (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 287 days.

(21) Appl. No.: 11/961,132

(22) Filed: Dec. 20, 2007

(65) Prior Publication Data
US 2008/0149531 A1 Jun. 26, 2008

(30) Foreign Application Priority Data
Dec. 21, 2006 (FR) .................................. 06 11403

(51) Int. Cl.
*C10G 47/04* (2006.01)
(52) U.S. Cl. .................. 208/108; 208/112; 502/314; 502/355
(58) Field of Classification Search ................ 208/108, 208/112, 146; 502/105, 113, 210, 211, 213, 502/355, 313, 314, 332
See application file for complete search history.

(56) References Cited

U.S. PATENT DOCUMENTS

| 2,651,617 | A | * | 9/1953 | Schmerling | .................. 502/28 |
|---|---|---|---|---|---|
| 4,498,972 | A | | 2/1985 | Toulhoat et al. | |
| 4,510,042 | A | | 4/1985 | Billon et al. | |
| 4,552,650 | A | | 11/1985 | Toulhoat et al. | |
| 4,584,093 | A | | 4/1986 | Toulhoat et al. | |
| 5,300,212 | A | | 4/1994 | Winter, Jr. | |
| 5,935,418 | A | | 8/1999 | Chakrabarty et al. | |
| 6,066,308 | A | | 5/2000 | Dupin et al. | |
| 2005/0211603 | A1 | * | 9/2005 | Guillaume et al. | ....... 208/111.3 |

FOREIGN PATENT DOCUMENTS

| FR | 2 496 631 A1 | 6/1982 |
|---|---|---|
| FR | 2 528 721 A1 | 12/1983 |
| FR | 2 534 828 A1 | 4/1984 |
| FR | 2 538 813 A1 | 7/1984 |
| FR | 2 538 814 A1 | 7/1984 |
| FR | 2 867 988 A1 | 9/2005 |
| WO | WO 2007/080288 A1 | 9/2005 |

* cited by examiner

*Primary Examiner*—Walter D Griffin
*Assistant Examiner*—Renee Robinson
(74) *Attorney, Agent, or Firm*—Millen, White, Zelano & Branigan, P.C.

(57) ABSTRACT

The invention concerns a process for converting heavy feeds carried out in a slurry reactor in the presence of hydrogen and in the presence of a catalyst comprising at least one catalytic metal or a compound of a catalytic metal from group VIB and/or VIII supported on alumina, the pore structure of which is composed of a plurality of juxtaposed agglomerates each formed by a plurality of acicular platelets, the platelets of each agglomerate being generally radially oriented with respect to the others and with respect to the center of the agglomerate, the catalyst having an irregular and nonspherical shape and being mainly in the form of fragments. The process of the invention employs a catalyst with a specific pore texture, shape and granulometry, resulting in improved performances.

20 Claims, No Drawings

PROCESS FOR SLURRY PHASE HYDROCONVERSION OF HEAVY HYDROCARBON FEEDS AND/OR COAL USING A SUPPORTED CATALYST

CROSS REFERENCES TO RELATED APPLICATIONS

This application is related to concurrently filed application "Process for the Hydroconversion in a Slurry of Heavy Hydrocarbonaceous Feedstocks in the Presence of a Dispersed Phase and an Alumina-Based Oxide" by Magalie Roy-Auberger. Attorney docket PET-2445 claiming priority of French application 06/11.405 filed Dec. 21, 2006.

PRIOR ART

The slurry process used for hydroconversion of heavy hydrocarbon fractions is a process which is known to the skilled person for hydrorefining heavy feeds, usually in the presence of a soluble catalytic precursor. U.S. Pat. No. 3,231,488 describes the injection of metals in an organometallic form to form, in the presence of hydrogen and/or $H_2S$, a finely dispersed catalytic phase allowing hydrorefining of the residue after injection into the feed. That catalytic phase is very finely divided and traverses the reaction zone with the liquid. In U.S. Pat. No. 4,244,839, C L Aldridge and R Bearden describe a catalytic phase, in particular for residue hydroconversion, prepared from a catalytic precursor which is soluble in oil and thermally decomposable, brought into contact with a feed containing Conradson carbon, at high temperature and in the presence of hydrogen and $H_2S$. Many catalytic precursors can act as thermally decomposable metallic compounds: organosoluble compounds such as molybdenum naphthenate, molybdenum octoate, but also aquasoluble compounds such as phosphomolybdic acid mentioned in U.S. Pat. No. 3,231,488 (UOP), U.S. Pat. No. 4,637,870 and U.S. Pat. No. 4,637,871 or ammonium heptamolybdate cited in U.S. Pat. No. 6,043,182. In the case of aquasoluble compounds, the catalytic precursor is generally mixed with the feed via an emulsion.

The action of such metallic compounds is well known to the skilled person: under certain conditions, and preferably in the presence of hydrogen sulphide and at high temperatures, said salts, acids or compounds containing metals from groups II, III, IV, V, VIB, VIB or VIII decompose to form dispersed metallic sulphides the catalytic activity of which in hydroconversion processes encourages, for example, cracking, hydrogenation, hydrodesulphurization, hydrodenitrogenation and hydrodemetallization reactions of heavy hydrocarbons.

U.S. Pat. No. 4,376,037 and U.S. Pat. No. 4,389,301 (Chevron) describe bringing an oil and hydrogen into contact in the presence of a dispersed hydrogenation catalyst and porous particles containing no hydrogenating compounds, and preferably cheap. The porous solid is typically used FCC catalyst with a particle size of 10 to 50 microns. The particles are preferably maintained in a restricted bed rather than being entrained with the feed. The authors mention a synergistic effect between the dispersed catalyst and the porous particles, which allows reduction to metals and asphaltenes in the effluents.

U.S. Pat. No. 4,937,218 and U.S. Pat. No. 6,384,091 from Intevep describe a hydroconversion process using a catalyst that can be regenerated formed in situ (i.e. in the slurry reactor itself) comprising an active phase and a refractory support. According to those patents, the advantage lies in forming a catalyst that can be regenerated. In the reaction zone, the organometallic salt interacts with the refractory solid to form a porous supported catalyst with good HDM, HDS and HDN activities.

Finally, FR-A-2 534 828 concerns a process for hydroconversion of crushed catalysts, principally operating in a fixed bed. It alludes to the use of such catalysts in processes in which the catalyst is dispersed in the liquid phase. However, it appears that the catalysts in that patent do not have sufficient mechanical strength for use in slurry processes operating on an industrial scale.

The Applicant has discovered that the use of a solid supported catalyst with a suitable granulometry and shape in a slurry operation for the hydroconversion of heavy hydrocarbon feeds containing metals can produce improved performances as regards effluent hydrogenation.

Said catalyst comprises a support in the form of alumina-based agglomerates, mainly irregular and non-spherical, the specific shape of which results from a crushing step and containing at least one catalytic metal or a compound of a catalytic metal from group VIB and/or group VIII (groups 8, 9 or 10 in the new periodic table notation), optionally at least one doping element selected from the group constituted by phosphorus, boron and halogens, said catalyst essentially being constituted by a plurality of juxtaposed agglomerates, each formed by a plurality of acicular platelets, the platelets of each agglomerate generally being orientated with respect to each other and with respect to the centre of the agglomerate.

Surprisingly, the Applicant has discovered that polymodal catalysts with a "thorny chestnut husk" structure in the form of alumina-based agglomerates, which are mainly irregular and non-spherical, can be obtained with an improved mechanical strength compared with those obtained by the process in patent application FR-A-2 534 828 by modifying the position of the crushing step in the steps of the preparation process. This important advantage allows the use of the catalyst in a slurry reactor to be envisaged, even though a catalyst obtained using the FR-A-2 534 828 process would be unsuitable.

Advantageously, the catalyst is injected into part of the liquid conversion products which contain hydrogen sulphide dissolved under temperature and pressure conditions close to those of the reaction zone.

The invention, which combines the use of a dispersed supported catalyst, the use of slurry and the use of a supported catalyst which is prepared ex situ, has many advantages, namely:

although the catalytic phase is deposited on a support, it remains in intimate contact with the large hydrocarbon structures because of the small grain size of the catalysts and the polymodal porosity of the support, termed a "thorny chestnut husk", which porosity encourages material transfer inside the pores;

the catalyst is supplied and renewed continuously with the feed, thereby limiting deactivation of the catalytic function, in particular by pore plugging;

the catalyst is prepared "ex situ" upstream of the reaction section, which can optimize its preparation by any method known to the skilled person, in particular as regards the dispersion of elements of the active phase on the support, away from all constraints of temperature, pressure, and the presence of carbonaceous molecules inducing coking;

the supported form of the active phase allows easy regeneration of the catalyst, because said active phase is stabilized on the alumina and thus there are no problems with sublimation thereof.

DESCRIPTION OF THE INVENTION

The invention concerns a process for converting heavy feeds carried out in a slurry reactor in the presence of hydrogen and in the presence of a catalyst comprising at least one catalytic metal or a compound of a catalytic metal from group VIB and/or VIII supported on alumina, the pore structure of which is composed of a plurality of juxtaposed agglomerates each formed by a plurality of acicular platelets, the platelets of each agglomerate being generally radially oriented with respect to the others and with respect to the centre of the agglomerate, said catalyst having an irregular and non-spherical shape and being mainly in the form of fragments, obtained using a preparation process including the following steps:
  a) granulation starting from an active alumina powder having a low crystallinity and/or amorphous structure, to obtain agglomerates in the form of beads;
  b) maturing in a moist atmosphere between 60° C. and 100° C. then drying said beads;
  c) sieving to recover a fraction of said beads;
  d) crushing said fraction;
  e) calcining at least a portion of said crushed fraction at a temperature in the range 250° C. to 900° C.
  f) impregnating with acid and hydrothermal treatment at a temperature in the range 80° C. to 250° C.;
  g) drying then calcining at a temperature in the range 500° C. to 1100° C.
  h) impregnating with at least one catalytic metal or compound of a catalytic metal from group VIB and/or group VIII.

The supported catalyst is injected and mixed with the feed, either upstream or directly into the reactor, and circulates in the slurry reactor with the hydrocarbon phase at a concentration with respect to the heavy hydrocarbon feed in the range 0.1% to 20%, preferably in the range 0.5% to 10% by weight.

The mean particle size of the catalyst is in the range 25 to 1000 microns, preferably in the range 100 to 800 microns.

The alumina-based support does not contain elements such as silica ($SiO_2$), silica-alumina, titanium dioxide ($TiO_2$), zeolites, or clays, either alone or as a mixture. Such elements can increase the surface acidity of said alumina-based oxide under the reaction conditions. This acidity is unacceptable as it generates major coking and premature blockage of the catalyst pores.

In contrast, the alumina-based support may contain elements which do not generate acidity, such as rare earths, alkaline-earth metals or phosphorus if it is introduced in an amount which is less than 2% by weight.

The alumina-based support, mainly in the irregular form, generally has the following characteristics:
  a loss on ignition, measured by calcining at 1000° C., is in the range from about 1% to 15% by weight;
  a specific surface area in the range 50 to 250 m$^2$/g;
  a total pore volume (TPV) in the range 0.5 to about 2.0 cm$^3$/g;
  a pore distribution, determined by Hg porosimetry (all Hg measurements in this text are carried out in accordance with standard 4284-92 with a wetting angle of 140°), preferably characterized as follows:
    % of total pore volume as pores with a mean diameter of less than 100 Å: between 0 and 10;
    % of total pore volume as pores with a mean diameter between 100 and 1000 Å: between 40 and 80;
    % of total pore volume as pores with a mean diameter between 1000 and 5000 Å: between 5 and 60, preferably between 8 and 35;
    % of total pore volume as pores with a mean diameter between 5000 and 10000 Å: between 3 and 50, preferably between 5 and 30;
    % of total pore volume as pores with a mean diameter of more than 10000 Å: between 5 and 20.

Preferably, the percentage of total pore volume as pores with a mean diameter of more than 1000 Å is more than 20% and the mean diameter of pores with a diameter of more than 1000 Å is in the range 4000 to 6000 Å.

The active phase of said catalyst contains at least one catalytic metal or a compound of a catalytic metal from group VIB (group 6 in the new periodic table notation), preferably molybdenum or tungsten, and/or optionally at least one catalytic metal or a compound of a catalytic metal from group VIII (groups 8, 9 and 10 in the new periodic table notation), preferably nickel or cobalt. Advantageously, catalyst may further comprise at least one doping element selected from phosphorus, boron and the halogens (group VIIA or group 17 of the new periodic table notation), preferably phosphorus. Preferably, the catalyst contains at least one group VIB metal (preferably molybdenum) and optionally at least one non-noble group VIII metal, preferably nickel. A preferred catalyst is of the Ni Mo P type.

The quantity of group VIB metal, expressed as a % by weight of oxide with respect to the weight of the final catalyst, is in the range 1% to 20%, preferably in the range 2% to 12%.

The quantity of non-noble group VIII metal, expressed as a % by weight of oxide with respect to the final catalyst weight, may be in the range 0 to 10%, preferably in the range 1% to 4%.

The quantity of phosphorus, expressed as a % by weight of oxide with respect to the final catalyst weight, may be in the range 0.3% to 10%, preferably in the range 1% to 5%, and more preferably in the range 1.2% to 4%.

The quantity of boron, expressed as a % by weight of oxide with respect to the weight of the final catalyst, is less than 6%, preferably less than 2%.

The atomic ratio between the elemental phosphorus and the group VIB element is advantageously in the range 0.3 to 0.75.

When at least one doping element is a halogenated element (group VIIA), the amount of halogen is less than 5% by weight with respect to the final catalyst weight.

The catalyst is added to the feed in a concentration (as the total % by weight with respect to the feed) in the range 0.1% to 20%, preferably in the range 0.5% to 10%.

PREPARATION OF SUPPORT

The alumina-based support has a pore structure which is composed of a plurality of juxtaposed agglomerates each formed by a plurality of acicular platelets, the platelets of each agglomerate generally being radially oriented with respect to the others and with respect to the centre of the agglomerate, said support having an irregular and non-spherical shape and being mainly in the form of fragments, obtained by crushing alumina beads, and prepared using a preparation process including the following steps:
  a) granulation starting from an active alumina powder having a low crystallinity and/or amorphous structure, to obtain agglomerates in the form of beads;

b) maturing in a moist atmosphere between 60° C. and 100° C. then drying said beads;
c) sieving to recover a fraction of said beads;
d) crushing said fraction;
e) calcining at least a portion of said crushed fraction at a temperature in the range 250° C. to 900° C.;
f) impregnating with acid and hydrothermal treatment at a temperature in the range 80° C. to 250° C.;
g) drying then calcining at a temperature in the range 500° C. to 1100° C.

The mean particle size of the support obtained at the end of the process is in the range 25 to 1000 microns, preferably in the range 100 to 800 microns.

a) The first step, termed granulation, aims to form substantially spherical agglomerates from an active alumina powder having a low crystallinity and/or amorphous structure produced using the process described in FR-A-1 438 497. That process consists of moistening, using an aqueous solution, the active alumina having a low crystallinity and/or amorphous structure, then agglomerating it in a granulator or pelletizer. Preferably, one or more pore-forming agents are added during granulation. Particular pore-forming agents which may be used are wood flour, wood charcoal, cellulose, starches, naphthalene and, generally, any organic compound which may be eliminated by calcining.

The term "low crystallinity alumina structure" means an alumina wherein X ray analysis produces a diagram having no or only a few diffuse lines corresponding to crystalline phases of the low temperature transition aluminas and essentially comprising khi, rho, eta, gamma or pseudo-gamma phases and mixtures thereof. The active alumina employed is generally obtained by rapid dehydration of aluminium hydroxides such as bayerite, hydrargillite or gibbsite, nordstrandite or aluminium oxyhydroxides such as boehmite or diaspore. Said dehydration may be carried out in any suitable apparatus using a stream of hot gas. The inlet temperature for the gas into the apparatus generally varies from about 400° C. to 1200° C. and the contact time for the hydroxide or oxyhydroxide with the hot gases is generally in the range between a fraction of a second and 4 to 5 seconds.

The specific surface area, measured by the BET method, of the active alumina obtained by rapid dehydration of hydroxides or oxyhydroxides is generally between about 50 and 400 m²/g; the particle diameter is generally in the range 0.1 to 300 micrometers and is preferably in the range 1 to 120 micrometers. The loss on ignition, measured by calcining at 1000° C., is generally in the range 3% to 15%, corresponding to a $H_2O/Al_2O_3$ molar ratio in the range from about 0.17 to 0.85.

In a particular implementation, an active alumina is preferably used which derives from the rapid dehydration of Bayer hydrate (hydrargillite) which is a readily commercially available, cheap aluminium hydroxide; such an active alumina is well known in the art; a process for its preparation has been described in FR-A-1 108 011.

The active alumina employed may be used as is or after treatment so that its sodium content, expressed as $Na_2O$, is less than 1000 ppm by weight. The active alumina employed may or may not have been milled.

b) The spherical agglomerates obtained are then matured in a moist atmosphere at low temperature, preferably in the range from 60° C. to about 100° C., then dried at a temperature which is generally 100° C. to 120° C.

c) At this stage, the agglomerates, substantially in the form of beads, have sufficient mechanical strength to be sieved to select the granulometric range which is suitable for the desired final granulometry. Thus, for example, to obtain a final oxide with a size range of 20 to 1000 microns, a bead fraction in the range 1000-2000 microns is sieved and selected;

d) Next, the bead fraction with the selected size range is crushed. This operation is carried out in any known crusher known to the skilled person and preferably in a ball mill. It lasts from 5 to 60 minutes, preferably 10 to 30 minutes.

At the end of the crushing step, the alumina particles are mainly in the form of fragments with a highly irregular and non-spherical shape. To better define the shape obtained, the fragments may be said to be in the form of broken beads without having very clean break surfaces, or in the form of solids the closest geometrical shape of which is an irregular polyhedron not necessarily having planar faces. The term "mainly" means that at least 50% by weight, preferably at least 60% by weight, of the spherical agglomerates have effectively undergone a modification of their shape during crushing, the complementary portion representing the spherical agglomerates remaining intact. It is well known that crushing is a low efficiency, crude operation and routinely, a non negligible portion of the grains is not crushed.

e) After the crushing step, at least a portion of the fragments is calcined at a temperature in the range from about 250° C. to about 900° C., preferably 500° C. to 850° C. The portion which is not calcined generally corresponds to fines which "do not fall within the required dimensional range". Preferably, the whole of the crushed fraction is calcined.

f) Acid impregnation of the support is then carried out, followed by hydrothermal treatment using the method described in U.S. Pat. No. 4,552,650 which may be applied in its entirety to the present process, i.e.:

the crushed agglomerates are treated in an aqueous medium comprising—and preferably constituted by—a mixture of at least one acid to dissolve at least a portion of the alumina of the oxide, and at least one compound supplying an anion which is capable of combining with aluminium ions in solution, the compound being chemically distinct from said acid;

simultaneously or successively treating the treated crushed agglomerates hydrothermally (or in an autoclave). The term "acid to dissolve at least a portion of the alumina of the oxide" means any acid which, brought into contact with the active alumina agglomerates defined above, dissolves at least a portion of the aluminium ions. The acid dissolves at least 0.5% and at most 15% by weight of the alumina of the agglomerates. Its concentration in the aqueous treatment medium is less than 20% by weight and preferably in the range 1% to 15%. Preferably, strong acids are used such as nitric acid, hydrochloric acid, perchloric acid or sulphuric acid, or weak acids such as acetic acid, used in a concentration such that their aqueous solution has a pH of less than about 4.

The term "compound supplying an anion capable of combining with aluminium ions in solution" means any compound which is capable in solution of liberating an anion $A^{n-}$ which with the $Al^{3+}$ cations is capable of forming products in which the atomic ratio n(A/Al) is 3 or less.

A particular case of these compounds may be illustrated by basic salts with general formula $Al_2(OH)_x A_y$, in which $0 \leq x \leq 6$; $ny<6$; n represents the number of charges on the anion A.

The concentration of that compound in the aqueous treatment medium is less than 50% by weight and preferably in the range 3% to 30%.

Preferably, compounds capable in solution of liberating anions selected from the group constituted by nitrate, chloride, sulphate, perchlorate, chloroacetate, dichloroacetate, trichloroacetate, bromoacetate, dibromoacetate anions, and anions with general formula RCOO(−) are used, in which R represents a radical from the group comprising H, $CH_3$, $C_2H_5$, $CH_3CH_2$, $(CH_3)_2CH$.

Compounds which are capable in solution of liberating the anion $A^{n-}$ may carry out said liberation either directly, for example by dissociation, or indirectly, for example by hydrolysis. The compounds may in particular be selected from the group comprising: mineral or organic acids, anhydrides, organic or mineral salts, and esters. Of the mineral salts, alkali salts or alkaline-earth salts which are soluble in aqueous media may be cited, such as those of sodium, potassium, magnesium or calcium, ammonium salts, aluminium salts and salts of rare earths.

This first treatment may be carried out either by dry impregnation of agglomerates or by immersing the agglomerates in the aqueous acid solution. The term "dry impregnation" means contact of alumina agglomerates with a volume of solution which is less than or equal to the total pore volume of the treated agglomerates.

In a particularly preferred implementation, the aqueous medium is a mixture of nitric and acetic acid or nitric acid and formic acid.

The hydrothermal treatment is carried out at a temperature in the range from about 80° C. to about 250° C., for a period of time in the range from about 5 minutes to about 36 hours.

This hydrothermal treatment causes no loss of alumina.

Preferably, the temperature is in the range 120° C. to 220° C. for a period in the range 15 minutes to 18 hours.

This treatment constitutes a hydrothermal treatment of the active alumina agglomerates which transforms at least a portion thereof into boehmite. This hydrothermal treatment (autoclaving) may be carried out either under saturated vapour pressure or at a partial vapour pressure of water vapour of at least 70% of the saturated vapour pressure corresponding to the treatment temperature.

The association of an acid which can dissolve at least a portion of the alumina and an anion which can form the products described above during hydrothermal treatment results in the production of a particular boehmite which is a precursor for the acicular support platelets of the invention the growth of which proceeds radially from crystallization seeds.

Further, the concentration of acid and compound in the treatment mixture and the hydrothermal treatment conditions employed are such that there is no loss of alumina. The increase in porosity following treatment is thus due to expansion of the agglomerates during treatment and not to a loss of alumina.

g) Finally, the crushed agglomerates are optionally dried at a temperature which is generally in the range from about 100° C. to 200° C. for a period which is sufficient to remove water which is not chemically bound. The agglomerates then undergo thermal activation at a temperature in the range from about 500° C. to about 1100° C. for a period in the range from about 15 minutes to 24 hours.

The active oxide of the alumina obtained in accordance with the invention, mainly with an irregular and non-spherical shape, generally has the following characteristics: the loss on ignition, measured by calcining at 1000° C., is in the range from about 1% to about 15% by weight; the specific surface area is in the range from about 80 to about 300 $m^2/g$; their total pore volume is in the range from about 0.45 to about 1.5 $cm^3/g$.

The resulting crushed active alumina agglomerates also preferably have the following characteristics:
  a specific surface area in the range 75 to 250 $m^2/g$;
  a settled packing density in the range from about 0.25 to 0.65 $g/cm^3$;
  a total pore volume (TPV) in the range 0.5 to about 2.0 $cm^3/g$;
  a pore distribution, determined using the Hg porosimetry technique, which is preferably characterized as follows:
    % of total pore volume as pores with a mean diameter of less than 100 Å: between 0 and 10;
    % of total pore volume as pores with a mean diameter between 100 and 1000 Å: between 40 and 80;
    % of total pore volume as pores with a mean diameter between 1000 and 5000 Å: between 5 and 60, preferably between 8 and 35;
    % of total pore volume as pores with a mean diameter between 5000 and 10000 Å: between 3 and 50, preferably between 5 and 30;
    % of total pore volume as pores with a mean diameter of more than 10000 Å: between 5 and 20.

The process cited above for preparing an alumina support can modify the pore volume distribution depending on the pore size of the untreated agglomerates. It can in particular increase the proportion of pores in the range 100 to 1000 Å, reduce the proportion of pores of less than 100 Å and reduce the proportion of pores of over 5000 Å and modify the proportion of pores in the range 1000 to 5000 Å to a lesser extent.

Preferably, the percentage of the total pore volume as pores with a mean diameter of more than 1000 Å is more than 20%, and the mean diameter of pores with a diameter of more than 1000 Å is in the range 4000 to 6000 Å.

h) Deposition of Active Phase (Metal or Catalytic Metal Compound

Deposition of active phase, i.e. at least one metal or compound of the catalytic metal from group VIB and/or VIII, and the doping element or elements onto the crushed alumina agglomerates is preferably carried out by the "dry" impregnation method which is known to the skilled person. Impregnation is highly preferably carried out in a single step using a solution containing all of the constituent elements of the final catalyst (co-impregnation). Other impregnation sequences may be carried out to obtain the catalyst.

It is also possible to introduce part of the metals and part of the doping element or elements or even all of them during preparation of the support, in particular during the granulation step.

Sources of elements from group VIB which may be used are well known to the skilled person. Examples of sources of molybdenum and tungsten which may advantageously be used are oxides, hydroxides, molybdic and tungstic acids and their salts, in particular ammonium salts such as ammonium molybdate, ammonium heptamolybdate, ammonium tungstate, phosphomolybdic and phosphotungstic acids and their salts, acetylacetonates, xanthates, fluorides, chlorides, bromides, iodides, oxyfluorides, oxychlorides, oxybromides, oxyiodides, carbonyl complexes, thiomolybdates and carboxylates. Preferably, oxides and ammonium salts are used, such as ammonium molybdate, ammonium heptamolybdate or ammonium tungstate.

Sources of group VIII elements which may be used are known; examples are nitrates, sulphates, phosphates, halides, carboxylates such as acetates or carbonates, hydroxides and oxides.

The preferred phosphorus source is orthophosphoric acid, however salts and esters such as alkaline phosphates, ammonium phosphates, gallium phosphates or alkyl phosphates are also suitable. Phosphorous acids, for example hypophosphorous acid, phosphomolybdic acid and its salts, phosphotungstic acid and its salts, may also advantageously be used. The phosphorus may, for example, be introduced in the form of a mixture of phosphoric acid and a basic nitrogen-containing organic compound such as ammonia, primary and secondary amines, cyclic amines, compounds from the pyridine family and quinolines and compounds from the pyrrole family.

The boron source may be boric acid, preferably orthoboric acid $H_3BO_4$, ammonium diborate or pentaborate, boron oxide or boric esters. The boron may, for example be introduced using a solution of boric acid in a water/alcohol mixture or in a water/ethanolamine mixture.

Sources of the group VIIA element (halogens) which may be used are well known to the skilled person. Examples are fluoride anions which may be introduced in the form of hydrofluoric acid or its salts. Said salts are formed with alkali metals, ammonium or an organic compound. In the latter case, the salt is advantageously formed in the reaction mixture by reaction between the organic compound and hydrofluoric acid. The fluorine may, for example, be introduced by impregnating with an aqueous solution of hydrofluoric acid or ammonium fluoride.

Advantageously, after said support impregnation, the process for preparing the catalyst of the present invention comprises the following steps:
  leaving the moist solid to mature in a moist atmosphere at a temperature in the range 10° C. to 80° C. and for a period in the range 12 to 36 hours;
  drying the moist solid obtained at a temperature in the range 60° C. to 150° C.;
  optionally, calcining the solid obtained after drying at a temperature in the range 150° C. to 800° C.

Calcining is not necessary in the case in which the impregnation solutions are examples of compounds containing elemental nitrogen, which inhibits sulphurization.

Characteristics of Catalyst

The pore distribution of the catalyst, determined by mercury porosity, is as follows:
  % of total pore volume as pores with a mean diameter of less than 100 Å: between 0 and 10;
  % of total pore volume as pores with a mean diameter between 100 and 1000 Å: between 40 and 80;
  % of total pore volume as pores with a mean diameter between 1000 and 5000 Å: between 5 and 60, preferably between 8 and 35;
  % of total pore volume as pores with a mean diameter between 5000 and 10000 Å: between 3 and 50, preferably between 5 and 30;
  % of total pore volume as pores with a mean diameter of more than 10000 Å: between 5 and 20.

The total pore volume of the catalysts of the invention, determined by mercury porosimetry, is in the range 0.4 to 1.8 $g/cm^3$.

Preferably, the pore texture is such that the diameter of the pores at VHg/2 is in the range 300 to 700 Å, i.e. the mean pore diameter wherein the volume on the pore distribution graph corresponds to half the total pore volume is in the range 300 to 700 Å, i.e. 30 to 70 nm.

Highly preferably, the percentage of the total pore volume in pores with a mean diameter of more than 1000 Å is more than 20% and the mean pore diameter with a size of more than 1000 Å is in the range 4000 to 6000 Å.

Said catalyst has a specific surface area, measured using the BET method, in the range 50 to 250 $m^2/g$.

The mechanical behaviour of the catalyst is determined by attrition in a stream of air using the ASTM D 5757-00 method. For said catalyst, the fines generated (with a size of less than 24 microns) during the test employed represents less than 5% by weight.

Use of Catalyst

The supported catalyst is injected and mixed with the feed either upstream or directly in the reactor and circulates with the hydrocarbon phase in the slurry reactor at a concentration in the range 0.1% to 20%, preferably in the range 0.5% to 10% by weight.

Preferably, the catalyst is sulphurized in the feed using dissolved hydrogen sulphide, before it arrives in the reaction zone.

In a particularly preferred implementation of the invention, the catalyst is injected into at least a portion of the liquid conversion products which contain dissolved hydrogen sulphide under temperature and pressure conditions close to those of the reaction zone. Advantageously, that injection takes place in the recycle loop for said conversion products.

In general, the conditions favourable to hydroconversion slurry reactor are as follows:
  total pressure in the range 1 to 50 MPa, preferably 2-30 MPa;
  partial pressure of hydrogen in the range 1 to 50 MPa, preferably 2-30 MPa;
  temperature in the range 300° C. to 600° C., preferably in the range 350° C. to 500° C.;
  residence time for liquid hydrocarbons in the reaction zone between 5 minutes and 20 hours, preferably between 1 h and 10 h.

The heavy feeds treated by the process of the invention are heavy hydrocarbon feeds such as distillates or residues from the vacuum distillation of oil. This may be coal or coke introduced in suspension into the liquid oil cuts.

More generally, the process is particularly suitable for the treatment of oil cuts such as atmospheric residues obtained by column bottom atmospheric distillation or a fraction of these residues or residues, derived from vacuum distillation (column bottom). These cuts are generally characterized by a boiling point of more than 540° C. for at least 80% by weight of compounds of the feed having initial boiling points of more than 300° C. They (fresh feeds) have a viscosity of less than 40000 cSt at 100° C., preferably less than 20000 cSt at 100° C., a Ni+V metals content of more than 1 ppm by weight, and an asphaltenes content, precipitated in heptane, of more than 0.1% by weight.

In an advantageous implementation, part of the converted effluents may be recycled upstream of the unit operating the hydroconversion. These recycled effluents contain part of the catalytic composition which is also recycled.

Regeneration of Catalyst

Generally, the catalyst is regenerated and recycled either completely or in part to the slurry reactor.

In a preferred implementation of the invention, the catalyst is separated from the products at the reactor outlet using any method which is known to the skilled person, such as distillation, filtration or solvent extraction, then is washed with a solvent dissolving a maximum of organic molecules.

It may then be regenerated, regeneration consisting of burning the coke adsorbed at the surface of the catalyst and in the pores, by heat treatment of said catalyst in an oxidizing atmosphere between 450° C. and 600° C.

In a more preferred implementation, chemical attack is carried out before or after the heat treatment step, preferably by an acid solution, to extract the major portion of the metals (nickel and vanadium) initially contained in the feed and which are deposited on the catalyst during hydroconversion and hydrodemetallization.

These operations could produce a regenerated catalyst with an activity very close to that of the fresh catalyst. Further, surprisingly, the porous thorny chestnut husk structure is preserved after regeneration.

If significant quantities of catalyst are to be recycled, the granulometric distribution thereof must be sufficiently stable. The various steps (separation of products, chemical attack, regeneration) must thus not cause too much wear of the catalyst, which involves providing a catalyst with sufficient mechanical strength as regards wear resistance.

The mechanical strength of the catalyst is determined by attrition in a stream of air using the ASTM D5757-00 method. The Applicant considers that to be capable of being regenerated, the catalyst must not generate more than 5% by weight of fines during the attrition test.

Example 1

Preparation of Alumina Support with Thorny Chestnut Husk Porous Structure (in Accordance with the Invention)

The starting material was alumina obtained by very rapid decomposition of hydrargillite in a stream of hot air (T=1000° C.). The product obtained was constituted by a mixture of transition aluminas: (khi) and (rho) aluminas. The specific surface area of this product was 300 m$^2$/g and the loss on ignition (LOI) was 5%.

The alumina (after milling) was in the form of a powder the mean particle diameter of which was 7 micrometers.

This alumina was mixed with wood flour as a pore-forming agent (15% by weight) then formed in a granulator or pelletizer for a period which was adapted to the desired granulometry. The agglomerates obtained underwent a maturation step by passing steam at 100° C. for 24 hours and drying. They were then sieved and crushed and finally calcined.

These beads were then dry impregnated with a solution containing, for example, a mixture of nitric acid and acetic acid in an aqueous phase in an impregnator drum. Once impregnated, they were introduced into an autoclave for about 2 hours, at a temperature of 210° C. and a pressure of 20.5 bars.

At the autoclave outlet, crushed alumina agglomerates were obtained in accordance with the invention which were dried for 4 hours at 100° C. and calcined for 2 hours at 650° C.

The agglomerate size was in the range 200 to 500 microns. Their pore volume was 0.95 cm$^3$/g. The specific surface area of the support was 130 m$^2$/g.

The pore distribution, determined by Hg porosimetry, was characterized as follows:

% of total pore volume as pores with a mean diameter of less than 100 Å: 0.2;

% of total pore volume as pores with a mean diameter between 100 and 1000 Å: 75;

% of total pore volume as pores with a mean diameter between 1000 and 5000 Å: 12.5;

% of total pore volume as pores with a mean diameter between 5000 and 10000 Å: 6;

% of total pore volume as pores with a mean diameter of more than 10000 Å: 6.5.

The percentage of the total pore volume with a mean diameter of more than 1000 Å was 25% and the mean diameter of pores with a diameter of more than 1000 Å was 5000 Å.

Example 2

Preparation of Support Constituted by Crushed Oxide of Alumina (not in Accordance with the Invention)

The starting material was a matrix composed of boehmite or alumina gel sold under the trade name Versal 250 by La Roche. This gel was mixed with an aqueous solution containing 52.7% of nitric acid (1% by weight of acid per gram of dry gel) then mixed for 20 minutes in a Z arm mixer. The paste was then mixed with an aqueous solution containing 20.3% ammonia (40 mole % of ammonia per mole of acid) for 5 minutes in the same mixer. At the end of mixing, the paste obtained was passed through a die with cylindrical orifices with a diameter of 1.0 mm or less on a piston extruder. The extrudates were dried overnight at 120° C. and calcined at 750° C. for two hours in a stream of moist air containing 200 g of water/kg of dry air, and finally crushed to obtain a fragment granulometry in the range 200 to 500 microns.

This oxide of alumina had a specific surface area of 190 m$^2$/g, a total pore volume of 0.95 cm$^3$/g, and a bimodal pore distribution. The pore distribution, determined by Hg porosimetry, was characterized as follows:

% of total pore volume as pores with a mean diameter of less than 100 Å: 5;

% of total pore volume as pores with a mean diameter between 100 and 1000 Å: 75;

% of total pore volume as pores with a mean diameter between 1000 and 5000 Å: 12;

% of total pore volume as pores with a mean diameter between 5000 and 10000 Å: 6;

% of total pore volume as pores with a mean diameter of more than 10000 Å: 2.

The percentage of the total pore volume with a mean diameter of more than 1000 Å was 15% and the mean diameter of pores with a diameter of more than 1000 Å was 3000 Å.

Example 3

Preparation of an Alumina Support with a Thorny Chestnut Husk Pore Structure (not in Accordance with the Invention)

A support was prepared in the form of beads using the operating procedure of Example 1, with the exception of the crushing step which was carried out after the autoclaving step.

Next, at the outlet from the autoclave after the drying (4 h, 100° C.) and calcining (2 h, 650° C.) steps, the beads were crushed and sieved to obtain a fraction in the size range 200-500 microns.

Example 4

Preparation of Catalysts A, B and C from the Supports of Examples 1, 2 and 3

The supports of Examples 1, 2 and 3 were dry impregnated with an aqueous solution comprising molybdenum and nickel salts and phosphoric acid. The molybdenum precursor was molybdenum oxide $MoO_3$ and that of nickel was nickel carbonate $Ni(CO_3)$. After maturing at ambient temperature in a water-saturated atmosphere, the impregnated supports were dried overnight at 120° C. then calcined at 500° C. for 2 hours in dry air. The final molybdenum trioxide content was 9.4% by weight of the finished catalyst. The final nickel oxide content NiO was 2% by weight of the finished catalyst. The final phosphorus oxide $P_2O_5$ content was 2% by weight of the finished catalyst.

The textural and physico-chemical characteristics of catalysts A, B and C respectively formed from the supports of Examples 1, 2 and 3 are shown in Table 1

TABLE 1

| | Catalyst | | |
|---|---|---|---|
| | A | B | C |
| $MoO_3$ (wt %) | 9.4 | 9.4 | 9.4 |
| NiO (wt %) | 2.0 | 2.0 | 2.0 |
| $P_2O_5$ (wt %) | 2.0 | 2.0 | 2.0 |
| $SiO_2$ (wt %) | — | — | — |
| Ni/Mo (at/at) | 0.40 | 0.40 | 0.40 |
| P/Mo (at/at) | 0.42 | 0.42 | 0.42 |
| dMo (at/nm$^2$) | 3.8 | 3.8 | 3.8 |
| $S_{BET}$ (m$^2$/g) | 97 | 105 | 103 |
| TPV Hg (cm$^3$/g) | 0.80 | 0.95 | 0.90 |
| dp at VHg/2 (Å) | 350 | 380 | 370 |
| V Hg > 500 Å (cm$^3$/g) | 0.35 | 0.44 | 0.40 |
| V Hg > 1000 Å (cm$^3$/g) | 0.26 | 0.30 | 0.28 |

In general, the pore distribution of the catalyst used in the process of the invention was almost identical to that of the support.

Example 5

Comparison of Mechanical Strength of Catalysts A, B, C

The mechanical strength of catalysts A, B and C was determined using the ASTM D5757-00 air jet attrition method, known as the "FCC attrition method".

Table 2 below shows the attrition results obtained for catalysts A, B, C.

TABLE 2

| | Catalyst | | |
|---|---|---|---|
| | A | B | C |
| % fines < 24 microns produced | 2% | 3% | 6% |

The percentage of fines produced by this method for catalyst C was incompatible with its use in the slurry application and regeneration.

Example 6

Comparison of Performances of Catalysts A, B, C for Slurry Mode Residue Hydroconversion, in a Batch Reactor Catalysts A, B and C were placed in a batch reactor with the feed at a concentration of 1% by weight. Stirring was continuous.

The feed used was an RA Zuata, rich in metals with the following characteristics:

| Feed | RA Zuata |
|---|---|
| Spec grav | 1.045 |
| Sulphur (weight %) | 4.35 |
| Nitrogen (ppm by weight) | 9000 |
| Viscosity (cSt) | 900 |
| Temp viscosity (° C.) | 125 |
| C. Conradson (wt %) | 19.95 |
| Asphalt. C7 (wt %) | 13 |
| Ni (ppm by weight) | 134 |
| V (ppm by weight) | 660 |
| DS: IP, ° C. | 295 |
| DS: 5% vol, ° C. | 375 |
| DS: 10% vol, ° C. | 419.5 |
| DS: 30% vol, ° C. | 540 |
| DS: 48% vol, ° C. | 613.5 |
| D1160: 60% vol, ° C. | — |

The autoclave test was carried out in two steps:
1) sulphurization step: the catalyst was mixed with the RA feed in the presence of DMDS (dimethyldisulphide) at a hydrogen pressure of 100 bars. It was heated to 350° C. for one hour: this temperature allowed the DMDS to decompose, which thereby generated a partial pressure of $H_2S$ simulating the partial pressure of $H_2S$ in the recycling circuit of an industrial unit. This step allowed the molybdenum deposited on the catalyst to be sulphurized;

2) the reactor was then cooled to a temperature below 100° C. and the hydrogen and $H_2S$ were stripped from the nitrogen.

Next, the hydroconversion step was initialized under the following conditions:

temperature: 410° C.;
$H_2$ pressure: 150 bar;
Residence time: 1 h30

At the end of the test, the solid phase was separated from the liquid phase by hot filtration; the metals and asphaltenes (insoluble C7s) were analyzed on the filtrate to determine the % HDM (hydrodemetallization) and HDAsphC7 (hydrodeasphalting).

| Catalyst | Conversion (wt %) | HDM (wt %) | HDAsphC7 |
|---|---|---|---|
| A | 52 | 77 | 60 |
| B | 50 | 72 | 57 |
| C | 52 | 76 | 59 |

Catalyst A (in accordance with the invention) thus had significantly improved catalytic performances as regards HDM and HDAsphC7 compared with those of catalyst B (not in accordance with the invention) which did not have a "thorny chestnut husk" pore texture. Further, they were also slightly better than those of catalyst C, which had a "thorny chestnut husk" pore texture but which did not have sufficient mechanical strength for use in a slurry reactor.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The preceding examples can be repeated with similar success by substituting the generically or specifically described reactants and/or operating conditions of this invention for those used in the preceding examples.

The entire disclosures of all applications, patents and publications, cited herein and of corresponding French application No. 06/11.403, filed Dec. 21, 2006 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process comprising converting heavy feeds in a slurry reactor in the presence of hydrogen and in the presence of a catalyst comprising at least one catalytic metal or a compound of a catalytic metal from group VIB and/or VIII supported on alumina, the pore structure of which is composed of a plurality of juxtaposed agglomerates each formed by a plurality of acicular platelets, the platelets of each agglomerate being generally radially oriented with respect to other platelets and with respect to the center of the agglomerate, said catalyst having an irregular and non-spherical shape and being mainly in the form of fragments, obtained using a preparation process including the following steps:

a) granulation starting from an active alumina powder having a low crystallinity and/or amorphous structure, to obtain agglomerates in the form of beads;
b) maturing said beads in a moist atmosphere between 60° C. and 100° C. then drying said beads;
c) sieving resultant dried beads to recover a fraction of said beads;
d) crushing said fraction of beads;
e) calcining at least a portion of said crushed fraction at a temperature in the range 250° C. to 900° C.;
f) impregnating the resultant calcined crushed fraction with acid and hydrothermal treatment at a temperature in the range 80° C. to 250° C.;
g) drying then again calcining the resultant at a temperature in the range 500° C. to 1100° C.;
h) impregnating at least one catalytic metal or a compound of a catalytic metal from group VIB and/or group VIII.

2. A process according to claim 1, in which said supported catalyst has a loss on attrition, quantified in accordance with the ASTM D5757-00 standard, of less than 5% by weight.

3. A process according to claim 1, in which the supported catalyst has a pore distribution, determined by Hg porosimetry, which is characterized as follows:
% of total pore volume as pores with a mean diameter of less than 100 Å: between 0 and 10;
% of total pore volume as pores with a mean diameter between 100 and 1000 Å: between 40 and 80;
% of total pore volume as pores with a mean diameter between 1000 and 5000 Å: between 5 and 60;
% of total pore volume as pores with a mean diameter between 5000 and 10000 Å: between 3 and 50;
% of total pore volume as pores with a mean diameter of more than 10000 Å: between 5 and 20.

4. A process according to claim 3, in which the pore distribution of said supported catalyst is characterized as follows:
% of total pore volume as pores with a mean diameter of less than 100 Å: between 0 and 10;
% of total pore volume as pores with a mean diameter between 100 and 1000 Å: between 40 and 80;
% of total pore volume as pores with a mean diameter between 1000 and 5000 Å: between 8 and 35;
% of total pore volume as pores with a mean diameter between 5000 and 10000 Å: between 5 and 30;
% of total pore volume as pores with a mean diameter of more than 10000 Å: between 5 and 20;
and with a pore diameter at VHg/2 in the range 300 to 700 Å.

5. A process according to claim 3, in which said catalyst has a percentage of the total pore volume as pores with a mean diameter of more than 1000 Å of more than 20% and a mean diameter of pores with a size of more than 1000 Å in the range 4000 Å to 6000 Å.

6. A process according to claim 1, in which the supported catalyst has a total pore volume, determined by Hg porosimetry, in the range 0.4 to 1.8 $cm^3/g$ and a specific surface area, measured by the BET method, in the range 50 to 250 $m^2/g$.

7. A process according to claim 1, in which the group VIB metal contained in said catalyst comprising molybdenum or tungsten.

8. A process according to claim 1, in which the group VIII metal contained in said catalyst comprising nickel or cobalt.

9. A process according to claim 1, in which said catalyst includes at least one doping element selected from phosphorus, boron and the halogens.

10. A process according to claim 9, in which the doping element in said catalyst comprising phosphorus.

11. A process according claim 1, in which said catalyst comprising NiMoP.

12. A process according to claim 1, having a mean size of the particles of said catalyst in the range 25 to 1000 microns.

13. A process according to claim 12, in which the mean particle size of said catalyst is in the range 100 to 800 microns.

14. A process according to claim 1, in which said catalyst is injected into at least a part of liquid conversion products which contain dissolved hydrogen sulphide, under temperature and pressure conditions close to those in which the slurry reactor operates.

15. A process according to claim 1, in which said catalyst is added to the heavy feed at a concentration in the range 0.1% to 20% by weight.

16. A process according to claim 15, in which said catalyst is added to the heavy feed in a concentration in the range 0.5% to 10% by weight.

17. A process according to claim 1, in which the slurry reactor is supplied with a feed having a boiling point more than 540° C. for at least 80% by weight of the compounds of the feed having initial boiling points of more than 300° C. and operates under the following conditions:
- total pressure in the range of 1 to 50 MPa;
- partial pressure of hydrogen in the range of 1 to 50 MPa;
- temperature in the range 300° C. to 600° C.;
- residence time for the hydrocarbons in the range of 5 minutes to 20 hours.

18. A process according to claim 1, in which said catalyst is regenerated by carrying out the following steps:
- separation of the catalyst from the products at the reactor outlet;
- washing with a solubilizing solvent;
- heat treatment of catalyst in an oxidizing atmosphere between 450° C. and 600° C.

19. A process according to claim 18, further comprising acidifying the catalyst before or after the heat treatment.

20. A process according to claim 1, wherein the hydrothermal treatment is carried out at a temperature of 120° C. to 220° C. for a period of 15 minutes to 18 hours.

* * * * *